3,225,008
ITACONIC ESTERS OF 1,2 ALKANE CARBONATES, POLYMERS, AND COPOLYMERS THEREOF
Gaetano F. D'Alelio, South Bend, Ind., assignor to Scott Paper Company, Philadelphia, Pa., a corporation of Pennsylvania
No Drawing. Filed May 21, 1962, Ser. No. 196,430
17 Claims. (Cl. 260—77.5)

This invention is concerned with new monomeric esters of itaconic acid and polymers and copolymers derived therefrom. Specifically it relates to itaconic esters of the general formula

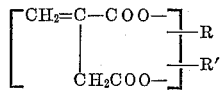

in which R represents H, a saturated aliphatic hydrocarbon radical containing one to eight carbon atoms, and R'; R' represents an alkylene dioxolone radical of the structure

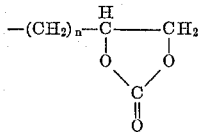

wherein $n$ is an integer having a value of one to four. The new monomeric esters of this invention are the itaconic esters of the alpha beta cyclic carbonates of alpha, beta, omega alkane triols containing three to six carbon atoms in the alkane chain having the formula

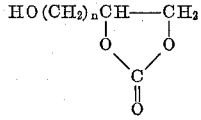

wherein $n$ is an integer having a value of one to four. Thus, the new monomers of this invention are the itaconic esters of the 1,2 carbonates of 1,2,3 propane triol; 1,2,4 butane triol; 1,2,5 pentane triol, and 1,2,6 hexane triol.

Itaconic acid is a dicarboxylic acid, and accordingly, the itaconic mono- and di-esters of the alcohols,

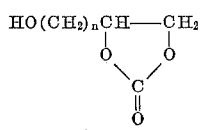

may be prepared and utilized in the practice of this invention.

In the monoesters, the remaining carboxylic group may be left unesterified or may be converted to another ester group containing one to eight carbon atoms as represented by R hereinabove. Illustrative examples of the aliphatic hydrocarbon radical R containing one to eight carbon atoms are methyl, ethyl, propyl, butyl, amyl, hexyl, heptyl and octyl, which may be linear or branched, such as isopropyl, secondary butyl, isoamyl, secondary actyl, etc.

The esters of this invention can be prepared by a number of methods. One convenient method is to use itaconic anhydride and the desired alcohol in accordance with the reaction

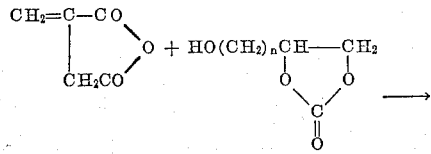

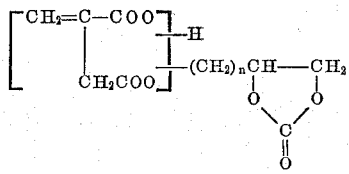

This esterification reaction using the anhydride may be performed simply by melting together the two reactants; but preferably to avoid decarboxylation or other side reactions, the esterification is performed in an inert solvent such as heptane, hexane, benzene, toluene, dioxane, tetrahydrofurane, etc., and isolating the product. The monoester thus formed can be used as such for the preparation of polymers and copolymers, or may be used as an intermediate in the preparation of diesters by conversion to an alkali metal salt, such as the sodium, potassium, lithium salt, etc., and reacting the salt with a dialkylsulfate, thus

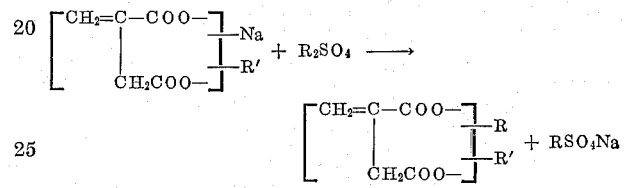

The new esters of this invention can be prepared also from itaconic acid, or the lower alkyl esters thereof, and the cyclic carbonate of the alkane triol desired in accordance with the general reaction

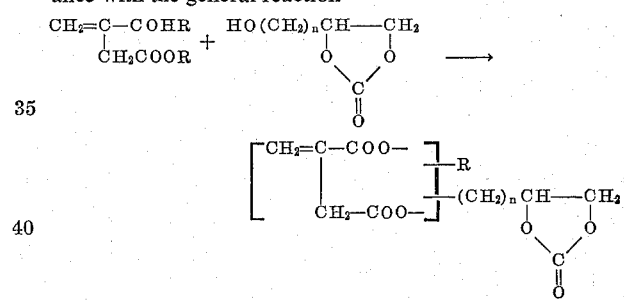

and

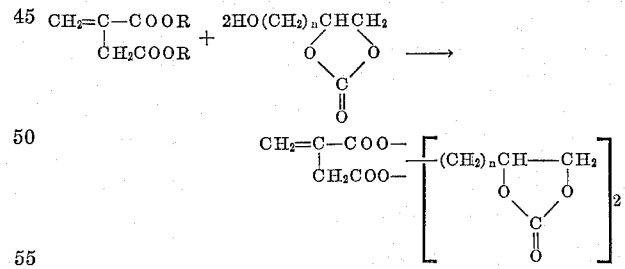

The preferred embodiment of R is methyl and ethyl in this reaction. Alternately, the mono- and di-acid chloride of itaconic acid can be used in preparing the new monomers, in the presence of a hydrohalide acceptor such as tributyl amine, sodium carbonate, etc., thus

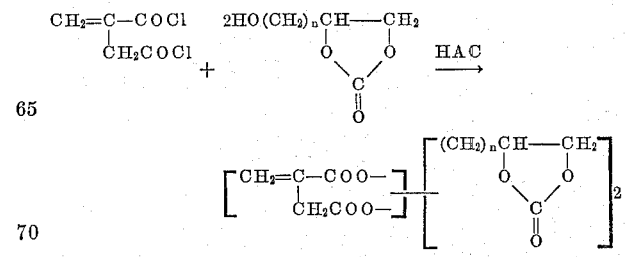

and

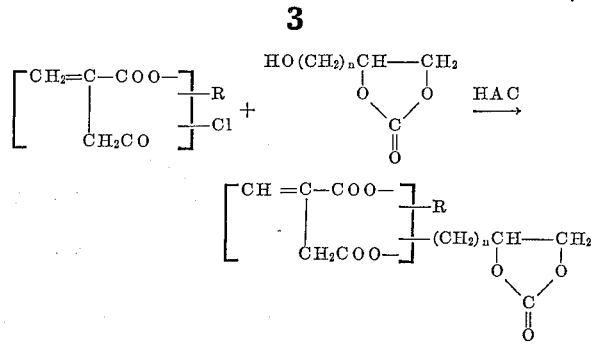

The specific method used in the preparation of the monomer depends in most cases on the monomer desired; for example, when the acid monoester is desired, the method using itaconic anhydride is preferred; when a symmetrical diester is desired then either itaconyl dichloride, dimethyl or diethyl itaconate is reacted with the cyclic carbonate of the alkane triol, and when a mixed ester, that is, an itaconic ester containing a lower alkyl group together with the cyclic carbonate ester group is desired, then the itaconyl chloride lower alkyl monoester, or a lower alkyl diester is reacted with the cyclic carbonate of the triol as indicated in the reactions hereinabove.

The esters of this invention are polymerizable monomers possessing a polymerizable $CH_2=C<$ structure and may be polymerized to form homopolymers, or copolymers from a mixture of two or more of these esters, or copolymers from one or more of these new esters with other monomers containing a vinyl, $CH_2=CH-$; a vinylidene, $CH_2=C<$; or a vinylene group,

illustrative examples of monomers containing such groups are the acrylic esters such as methyl acrylate, ethyl acrylate, hexylacrylate, allylacrylate, phenylacrylate, benzylacrylate, methyl-alpha-chloroacrylate, etc.; the methacrylic esters such as methyl methacrylate, ethyl methacrylate, propyl methacrylate, methallyl methacrylate, ethylene dimethacrylate, etc.; the vinyl esters such as vinyl chloride, vinyl acetate, vinyl stearate, vinyl benzoate, vinyl chloroacetate, divinyl phthalate, divinyl succinate, etc.; the polymerizable amides and nitriles such as acrylamide, hydroxymethylacrylamide, methacrylamide, itaconic monoamides, itaconic diamide, acrylonitrile, methacrylonitrile, etc.; the alkenyl aryl compounds such as styrene, o-methyl styrene, p-methyl styrene, alpha-methyl styrene, the chloro-styrenes, divinyl benzene, diallyl benzene, etc.; the mono- and polyallyl esters such as allyl acetate, diallyl succinate, diallyl phthalate, diallyl maleate, diallyl fumarate; the vinylidene compounds such as vinylidene chloride, vinylidene cyanide, methylene malonic esters, etc.; vinylene compounds such as vinylene carbonates, maleic anhydride, maleic monoesters and maleic diesters; the itaconic compounds such as itaconic anhydride, the itaconic mono- and the itaconic diesters of the lower and higher aliphatic alcohols; the dienes such as butadiene, isoprene, 2-chlorobutadiene 1,3, and the like. The proportion of the new monomers in copolymers with other monomer will depend, in accordance with the accepted principles of copolymerization, on the reactivity and selectivity constants, $r_1$ and $r_2$ of the comonomers used in preparing the copolymer, the ratio of the monomers used and the extent of conversion. However, by selecting appropriate conditions for the copolymerization, copolymers, using the new monomers of this invention can be made to contain effective and small amounts of these new monomers, for example, of the order of from 0.1% to 0.5% to very high amounts of the order of 99.5 to 99.9% in the final copolymers.

The new monomers of this invention can be polymerized by the known methods used to polymerize acrylic, methacrylic or itaconic compounds containing the $CH_2=C<$ group. The new monomers, in the presence or absence of other polymerizable $>C=C<$ containing monomers, can be polymerized in bulk, solution, emulsion, or suspension with or without polymerization initiators and other modifiers. As polymerization initiators there can be used the per-compounds, such as potassium persulfate, tertiary butyl peracetate, benzoyl peroxide, cumene hydroperoxide, tertiary butyl peroxide, tertiary butyl perbenzoate, hydrogen peroxide with or without ferrous salts, etc.; the azo catalysts such as alpha, alpha'-azobis(isobutyronitrile), ultraviolet light in the absence or presence of ketones, ionizing radiation from X-rays, electron and particle accelerators, cobalt 60 sources, etc.

In solution polymerization the medium can be selected from solvents which retain the polymer in solution throughout the polymerization, or can be chosen so that the polymer precipitates when formed and can be selected from the class of aliphatic, cycloaliphatic and aromatic hydrocarbons, esters, ethers, ketones, halogenated hydrocarbons, etc., or mixtures thereof depending on the form in which the polymer is desired. When halogenated hydrocarbons are used, they also act as modifiers of the polymerizations. In emulsion polymerization, the emulsifying agent to be used in the aqueous system is selected from the class of fatty acid soaps, salts of sulfonated alkyl benzenes, polyvinyl alcohol, gelatin, polyacrylic acid, salts of styrene-maleic acid polymers, gelatin and the like, which can be used alone or with buffering agents such as sodium acetate, borax, trisodium phosphate and the like. In suspension polymerization, the dispersion agent can be selected from the class of insoluble inorganic carbonates, phosphates and silicates to be used alone or in the presence of minor amounts of deflocculating agents such as sodium dodecylbenzene sulfonate or potassium stearate.

The following examples illustrate the synthesis of the monomers, polymers, and copolymers of this invention and are not given by way of limitation but by way of illustration. The parts and percentages given are parts and percentages by weight unless otherwise specified.

EXAMPLE I

There were combined in 500 parts of benzene, 84.0 parts of itaconic anhydride and 88.5 parts of glyceryl carbonate,

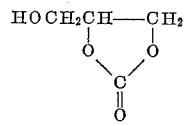

in a reaction vessel equipped with stirrer, condenser, and heating means, and the mixture refluxed at 60° C. for 48 hours. Upon standing at room temperature, crystals of the ester product are formed and when separated from the benzene by filtration will be in an almost quantitative yield. The crude can be used as such or may be purified by recrystallization from water. The ester product has a melting point of 132–134° C.

Elemental analysis for C and H gives values of 46.85% and 4.57% respectively, which is in excellent agreement with the calculated values of 47.0% and 4.35% respectively, for the compound, 4-(1,3 dioxolone-2) methyl hydrogen itaconate, represented by the formula

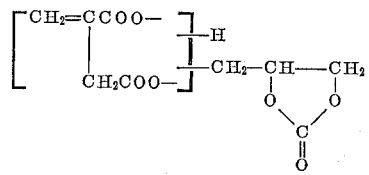

EXAMPLE II

The procedure of Example I was repeated using 1,2 carbonate of 1,2,6 hexanetriol instead of glyceryl carbonate, and there was obtained an itaconate represented by the formula

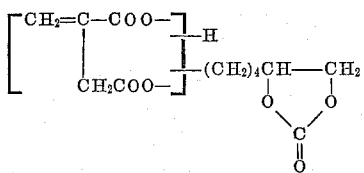

which on analysis for C and H and acid number determination give values in close agreement with the theoretical values for the compound.

EXAMPLE III

In a well-stirred reaction vessel containing 200 parts of benzene and 23 parts of the monomer of Example I was added 4.0 parts of NaOH in 50 parts of ethyl alcohol to form the sodium salt. To this mixture was added slowly over a period of one hour 12.6 parts of dimethyl sulfate and the mixture heated at 60–70° C. for two hours, following which it is allowed to cool to room temperature and filtered to remove solid salts. The benzene solution was washed with dilute aqueous sodium carbonate solution and with distilled water until neutral; then dried with anhydrous sodium sulfate which is removed by filtration. The benzene solution containing the crude product was treated with activated carbon, filtered and concentrated at a reduced pressure of 15–30 mm., leaving the ester as a colorless viscous oil distillation of which was not possible without the pyrolytic elimination of $CO_2$. Elemental analysis of the viscous oil gives values of 49.06% C and 4.92% H, which is in good agreement with the calculated values of 49.13% C and 4.914% H for the compound

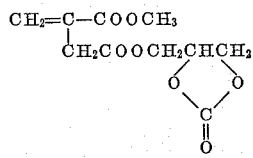

When an equivalent amount of diethyl sulfate was used for the dimethyl sulfate in this procedure, then the corresponding ethyl ester was obtained, as

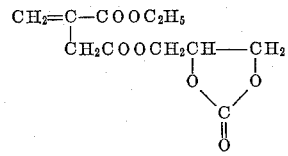

EXAMPLE IV

To a reaction vessel equipped with stirrer, condenser and inlet containing 1600 parts of benzene, 236 parts of glyceryl carbonate, and 205 parts of triethyl amine and cooled to 0.5° C. was slowly added over a period of five hours 165 parts of itaconyl chloride in 135 parts of benzene, following which the reaction mixture was allowed to come to room temperature during a period of five hours. The mixture was filtered to remove

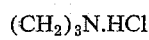 $(CH_2)_3N \cdot HCl$ and the filtrate washed with dilute aqueous $Na_2CO_3$ solution until slightly alkaline and then with distilled water until neutral. The benzene solution of the ester was dried with anhydrous $Na_2CO_3$, filtered and the filtrate separated from benzene by distillation under reduced pressure, leaving a clear viscous oil which cannot be distilled at 10 mm. without evidence of the pyrolytic elimination of $CO_2$. Elemental analysis of the residual oil gave values for C and H of 46.96% and 4.18% respectively, which is in good agreement for the calculated values of 47.27% and 4.24% for the compound

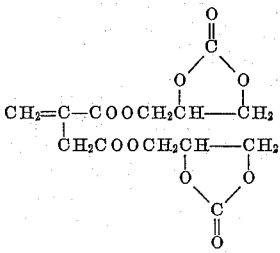

When the glyceryl carbonate of this example is replaced by an equivalent amount of the homologous carbonates, such as

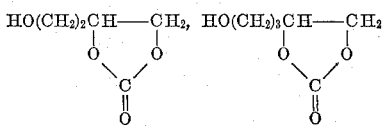

and

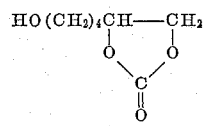

then the corresponding itaconic diesters are obtained.

EXAMPLE V

To a reaction vessel equipped with a stirrer, condenser, and inlet was added 1000 parts of toluene, 112 parts of itaconic anhydride and 130 parts of octyl alcohol and the mixture heated under reflux for five hours to produce the octyl hemi-itaconate,

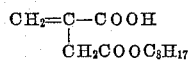

To the reaction mixture then was added 119 parts of thionyl chloride and reflux continued until $SO_2$ and HCl were no longer liberated from the reaction, leaving the acid chloride,

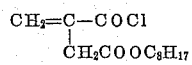

in solution. The reaction solution was cooled to 0–5° C., and there was added slowly over a period of five hours a mixture of 101 parts of triethyl amine and 118 parts of glyceryl carbonate in 200 parts of ethyl ether, following which the mixture was allowed to come to room temperature. The mixture was then filtered to remove $(C_2H_5)_3N \cdot HCl$ washed and dried according to the procedure of Example IV, after which the solvent was removed by distillation under reduced pressure, leaving a clear viscous oil which is not distillable at 5 mm. pressure without evidence of pyrolytic $CO_2$ evolution. Elemental analysis for carbon and hydrogen give values of 59.8% and 7.55% respectively, which is consistent with the formula

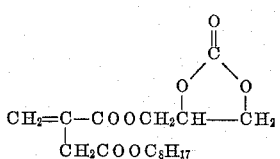

The copolymerization of the monomers of this invention is illustrated by the use of the itaconic ester of glyceryl carbonate of Example I, with a number of monomers such as styrene, vinyl acetate, methylacrylate and methyl methacrylate as examples of monomers containing a $CH_2=C<$ group. The $r_1$ and $r_2$ values of the pair of monomers were determined by the methods given in J.A.C.S. 66, 1594 (1944) and 67, 1701 (1945).

EXAMPLE VI

Styrene and the itaconic ester of glyceryl carbonate, were mixed in the mole ratios 0.4:1, 0.5:1, 0.6:1, 0.86:1, 1:1, 3:1, 7:1, 10:1, and 15:1 respectively, and sufficient purified acetone added to produce a 20% solution of monomers in solvent. The mixtures were polymerized at 50° C. using an amount of benzoyl peroxide equivalent to 0.25% by weight of the monomer as the catalyst and the $r_1$, for styrene and $r_2$ for the carbonate were determined as 0.45 and 0.53 respectively by the methods referred to hereinabove. The copolymers obtained from these various ratios were soluble in a variety of solvents such as acetone, dioxane, toluene, dimethyl formamide, dimethyl sulfoxide, ethylene carbonate, etc., but extended heating at elevated temperatures in the range of from 130 to 180° C. resulted in crosslinking and/or foaming of the polymeric compositions and the insolubilization thereof.

EXAMPLE VII

Vinyl acetate and the itaconic ester of glyceryl carbonate are mixed in the mole ratios of 0.35:1; 0.5:1; 0.65:1; 0.90:1; 1:1; 3:1; 7:1; 10:1; and 15:1 and sufficient acetone added to produce a 20% solution of monomer in the solvent. The mixtures were polymerized at 50° C. using 1.5% 2,2'-azo-bis-(isobutyronitrile) as the catalyst, and the values of $r_1$ for vinyl acetate and $r_2$ for the carbonate determined as in Example VI. The values of $r_1$ and $r_2$ are found to be $0.04 \pm 0.03$ and $3.35 \pm 0.25$ respectively.

EXAMPLE VIII

Copolymers of methacrylate and the itaconic ester of glyceryl carbonate exhibited $r$ values as determined by the procedure of Example VI of $0.41 \pm 0.06$ for $r_1$ and $1.64 \pm 0.4$ for $r_2$.

EXAMPLE IX

The values of $r_1$ for methyl methacrylate and $r_2$ for the itaconate as determined by the procedure of Example VI are $1.38 \pm 0.25$ and $0.24 \pm 0.15$ respectively.

With these known values of $r_1$ and $r_2$ for the various monomer pairs, copolymers of desired composition can be readily prepared according to the standard procedures known in the art.

EXAMPLE X

As an illustration of solution copolymerization, 95 parts of styrene, 5 parts of the monomer of Example III,

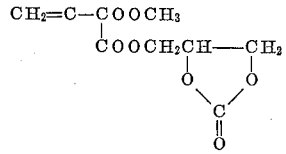

and 200 parts of toluene containing 1 part of 2,2'-azobis-isobutyronitrile were heated in a reactor at 75–80° C. for 24 hours, producing a clear colorless polymer solution useful directly as a coating composition which can be converted to an insoluble product by heating to temperatures of 180–190° C. A product suitable for molding can be obtained from the toluene solution by precipitation with methyl alcohol.

EXAMPLE XI

As an illustration of emulsion polymerization, 90 parts of vinyl acetate, 10 parts of

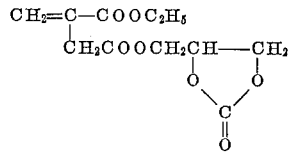

the ethyl ester embodiment of Example III, 100 parts of water containing 1.5 parts of polyvinyl alcohol and 0.5 part of potassium sulfate were heated in a suitable reactor at 75–80° C. for 12 hours producing a latex which can be used directly as an adhesive.

EXAMPLE XII

Thirty parts of

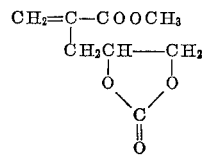

the monomeric methyl ester of Example III, 1 part of benzoyl peroxide are mixed and heated at 80° C. for 72 hours, producing a thick viscous polymer which on continued heating at 125° C. became insoluble in toluene. The intermediate viscous polymer is suitable as a casting resin.

From the foregoing examples it may be seen that the new monomeric esters of this invention are quite versatile, their inherent characteristics enable the production of a wide range of polymers and copolymers. By varying the conditions of polymerization, such as the nature of the catalyst, as well as its concentration, the temperature of polymerization, the choice of the medium, if any, in which the polymerization is performed, and the selection of as well as the ratio of monomeric compounds employed, the physical and chemical properties of the ultimate polymer can be controlled. Additionally as has been pointed out hereinabove these new monomeric esters contain a $CH_2=C<$ grouping permitting their polymerization by the regular procedures used in polymerizing acrylic and itaconyl monomers; moreover, since they contain a cyclic carbonate structure, they can undergo secondary reactions utilizing the carbonate ring rather than the $CH_2=C<$ grouping. One feature of this secondary reaction involves the elimination of $CO_2$ from the monomer on heating. In the absence of other reagents which modify the course of the reaction; the neutral esters of this invention such as

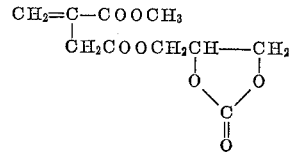

and

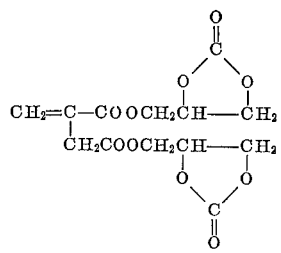

begin to evolve $CO_2$ noticeably in the temperature range of 200–210° C., whereas if one of the carboxyl groups is left unesterified, for example as in $$CH_2=CCOOH$$
$$\dot{C}H_2COOCH_2CH\!-\!\!-\!\!CH_2$$

the elimination of $CO_2$ is noticeable in the temperature range of 140–150° C.; and this reaction is probably due, and favored by, the transesterification of the free —COOH group with the cyclic carbonate ring

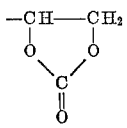

with release of $CO_2$. The variation in temperature required to eliminate $CO_2$ is carried into the polymers and copolymers of the monomeric esters of this invention when they contain a free carboxylic group. This phenomena is also observed when the carboxyl group is not part of the monomeric ester but is present as an element of a $CH_2$=C< containing monomer, such as acrylic acid, methacrylic acid, itaconic acid, itaconic acid monoester, maleic acid, fumaric acid, maleic acid monoester, which has been copolymerized with the neutral, or diesters of this invention. It was also discovered, in the use of the new monomers and polymers of this invention, that the temperature of $CO_2$ liberation could be greatly reduced in the presence of chemical modifiers such as acid and salts, for example, $H_3PO_4$, $Na_2CO_3$, $NaHCO_3$, $ZnCl_2$, $FeSO_4$, etc. As illustrative of this improvement, the addition of 1% $ZnCl_2$ to

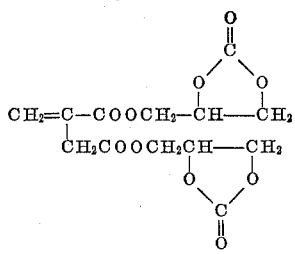

reduces the $CO_2$ elimination temperature from about 200° C. to about 110° C. These modifiers thereby increase the utility of the monomers and polymers of this invention by avoiding thermal pyrolysis of the compounds through lowering of the temperature needed to generate $CO_2$, when a foamed polymer is desired. Though the monomers of this invention are particularly useful in the preparation of polymers for the coating, laminating, molding and foamed polymer arts, they are useful in themselves as foaming agents to be added alone or with modifiers to other preformed polymers to produce foamed composition.

It will be obvious that variations in the component elements of the newly described compounds, the manner of their preparation and utilization are possible without departing from the spirit of the invention or the scope of the appended claims.

What I claim is:

1. As new compounds, monomeric esters having structures designated by the formula

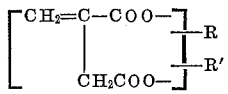

in which R is a member of the class consisting of hydrogen, a saturated hydrocarbon radical containing from one to eight carbon atoms and R', and R' represents

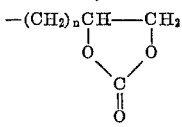

in which $n$ is an integer having a value of from 1 to 4 inclusive.

2. A monomeric ester having a structure designated by the formula

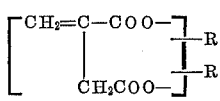

in which R is a member of the class consisting of hydrogen, a saturated hydrocarbon radical containing from one to eight carbon atoms and R', and R' represents

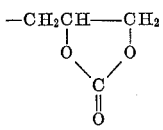

3. A monomeric ester having the formula

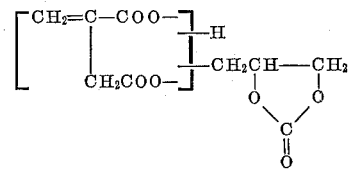

4. A monomer having the formula

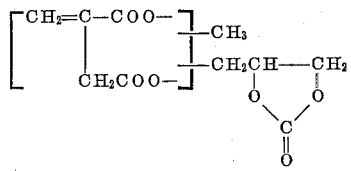

5. A monomer having the formula

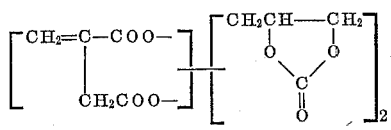

6. The polymerization product of a monomer of claim 1.
7. The polymerization product of a monomer of claim 2.
8. The polymerization product of a monomer of claim 3.
9. The polymerization product of the monomer of claim 4.
10. The polymerization product of the monomer of claim 5.
11. A copolymer of a monomer of claim 1 and at least one copolymerizable ethylenically unsaturated compound.
12. A copolymer of a monomer of claim 2 and at least one ethylenically unsaturated compound copolymerizable with a monomer of claim 2.
13. A copolymer of a monomer of claim 3 and at least one vinylidene compound copolymerizable with monomers of claim 3.
14. A copolymer of the monomer of claim 4 and at least one ethylenically unsaturated compound copolymerizable with the monomer of claim 4.
15. A copolymer of the monomer of claim 5 and at least one ethylenically unsaturated compound copolymerizable with the monomer of claim 5.
16. A copolymer as defined in claim 12 in which the ethylenically unsaturated compound is styrene.
17. A copolymer as defined in claim 13 in which the ethylenically unsaturated compound is styrene.

References Cited by the Examiner

UNITED STATES PATENTS

| | | | |
|---|---|---|---|
| 2,403,112 | 7/1946 | Muskat | 260—77.5 |
| 2,967,173 | 1/1961 | Fang | 260—77.5 |
| 2,979,514 | 4/1961 | O'Brien et al. | 260—77.5 |

FOREIGN PATENTS 611,033   12/1960   Canada.

LEON J. BERCOVITZ, *Primary Examiner.*

J. R. LIBERMAN, *Examiner.*